United States Patent
Kito et al.

(10) Patent No.: US 11,046,822 B2
(45) Date of Patent: *Jun. 29, 2021

(54) MODIFIER, USAGE THEREFOR, PRODUCTION METHOD FOR MODIFIER, AND CARRIER FOR ADDITIVE MATERIAL

(71) Applicant: TOYOTA BOSHOKU KABUSHIKI KAISHA, Aichi (JP)

(72) Inventors: Masayuki Kito, Aichi (JP); Goro Takahashi, Aichi (JP); Toshihiro Suzuki, Aichi (JP); Mitsutaka Sako, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/992,469

(22) Filed: Aug. 13, 2020

(65) Prior Publication Data

US 2020/0369836 A1    Nov. 26, 2020

Related U.S. Application Data

(62) Division of application No. 15/776,867, filed as application No. PCT/JP2016/085453 on Nov. 29, 2016, now abandoned.

(30) Foreign Application Priority Data

Dec. 1, 2015 (JP) .............................. JP2015-235171

(51) Int. Cl.
| | | |
|---|---|---|
| *C08J 3/20* | (2006.01) | |
| *C08L 23/26* | (2006.01) | |
| *C08L 77/00* | (2006.01) | |
| *C08L 23/10* | (2006.01) | |
| *C08J 3/22* | (2006.01) | |
| *C08L 23/00* | (2006.01) | |
| *C08J 3/205* | (2006.01) | |

(52) U.S. Cl.
CPC ................ *C08J 3/201* (2013.01); *C08J 3/20* (2013.01); *C08J 3/2053* (2013.01); *C08J 3/22* (2013.01); *C08L 23/00* (2013.01); *C08L 23/10* (2013.01); *C08L 23/26* (2013.01); *C08L 77/00* (2013.01); *C08J 2323/08* (2013.01); *C08J 2423/16* (2013.01); *C08J 2425/06* (2013.01); *C08J 2477/00* (2013.01); *C08L 2201/00* (2013.01); *C08L 2205/02* (2013.01); *C08L 2205/03* (2013.01); *C08L 2205/05* (2013.01); *C08L 2207/02* (2013.01)

(58) Field of Classification Search
CPC ..... C08L 77/00–10; C08L 2205/02–03; C08L 23/02; C08L 23/025; C08L 23/04; C08L 23/06; C08L 23/08; C08L 23/0807; C08L 23/0815; C08L 23/0823; C08L 23/083; C08L 23/0838; C08L 23/10; C08L 23/12; C08L 23/14; C08L 23/142; C08L 23/18; C08L 23/20; C08L 23/22; C08L 23/24
See application file for complete search history.

(56) References Cited

U.S. PATENT DOCUMENTS

| | | | |
|---|---|---|---|
| 5,453,462 A | 9/1995 | Watanabe et al. | |
| 5,504,139 A | 4/1996 | Davies et al. | |
| 5,693,424 A | 12/1997 | Watanabe et al. | |
| 5,750,620 A | 5/1998 | Davies et al. | |
| 9,353,251 B2 | 5/2016 | Kito et al. | |
| 9,493,642 B2 | 11/2016 | Kito et al. | |
| 10,717,827 B2 | 7/2020 | Kito et al. | |
| 2012/0028047 A1 | 2/2012 | Imai et al. | |
| 2014/0364569 A1* | 12/2014 | Kito ........................ | C08L 23/02 525/183 |
| 2014/0371394 A1 | 12/2014 | Kito et al. | |
| 2015/0218373 A1 | 8/2015 | Kawada et al. | |
| 2018/0334560 A1 | 11/2018 | Kito et al. | |
| 2019/0100645 A1 | 4/2019 | Kito et al. | |
| 2020/0032018 A1 | 1/2020 | Kito et al. | |

FOREIGN PATENT DOCUMENTS

| | | | |
|---|---|---|---|
| EP | 0 261 748 A2 | 3/1988 | |
| EP | 0 472 344 A2 | 2/1992 | |
| EP | 0 578 056 A2 | 1/1994 | |

(Continued)

OTHER PUBLICATIONS

Office Action issued in Japan Counterpart Patent Appl. No. JP 2017-519726, dated Jan. 29, 2018, along with an English translation thereof.
International Search Report from Patent Application No. PCT/JP2016/085453, dated Feb. 14, 2017.
International Preliminary Report on Patentability from Patent Application No. PCT/JP2016/085453, dated Jun. 5, 2018.
Office Action in Korean Application No. 10-2018-7017666 dated Jan. 23, 2019.
Office Action and Search Report issued for Russian App. No. 2018122464 dated Mar. 14, 2019.

(Continued)

*Primary Examiner* — Ana L. Woodward
(74) *Attorney, Agent, or Firm* — Greenblum & Bernstein P.L.C.

(57) ABSTRACT

A method for using a modifier that includes mixing 0.5 parts by mass or more but 70 parts by mass or less of the modifier per 100 parts by mass of a first polyolefin resin. The modifier is composed of a continuous phase (A) containing a second polyolefin resin, and a dispersed phase (B) dispersed in the continuous phase (A) and containing a polyamide resin and a modified elastomer. The dispersed phase (B) is composed of a melt-kneaded product of the polyamide resin and the modified elastomer having a reactive group that reacts with the polyamide resin. When a total of the continuous phase (A) and the dispersed phase (B) is 100% by mass, a content of the dispersed phase (B) is 80% by mass or less.

7 Claims, 2 Drawing Sheets

(56) References Cited

FOREIGN PATENT DOCUMENTS

| | | |
|---|---|---|
| EP | 1 741 542 A2 | 1/2007 |
| JP | S63-89550 A | 4/1988 |
| JP | H03-66735 A | 3/1991 |
| JP | H04-96969 A | 3/1992 |
| JP | H04-183733 A | 6/1992 |
| JP | H04-202247 A | 7/1992 |
| JP | H07-18088 A | 1/1995 |
| JP | 2000-108263 A | 4/2000 |
| JP | 2001-226537 A | 8/2001 |
| JP | 2003-128057 A | 5/2003 |
| JP | 2003-128846 A | 5/2003 |
| JP | 2007-161963 A | 6/2007 |
| JP | 2009-74081 A | 4/2009 |
| JP | 2009-74082 A | 4/2009 |
| JP | 2013-147645 A | 8/2013 |
| JP | 2013-147646 A | 8/2013 |
| JP | 2013-147647 A | 8/2013 |
| JP | 2013/147648 A | 8/2013 |
| JP | 2014-25060 A | 2/2014 |
| JP | 2014-28915 A | 2/2014 |
| JP | H04-96957 A | 3/2018 |
| RU | 2 272 709 C2 | 7/2005 |
| WO | 91/02027 A1 | 2/1991 |
| WO | 94/01495 A1 | 1/1994 |
| WO | 2009/069725 A1 | 6/2009 |
| WO | 2010/107022 A1 | 9/2010 |
| WO | 2013/094763 A1 | 6/2013 |
| WO | 2013/094764 A1 | 6/2013 |

OTHER PUBLICATIONS

EESR for EP App. No. 16870675.2 dated May 7, 20197.
Office Action for EP App. No. 16870675.2 dated Jan. 2, 2020.
Office Action for IN App. No. 201817015353 dated Dec. 16, 2019.
Office Action for CN App. No. 201680068288.3 dated Mar. 4, 2020.
Office Action for JP App. No. 2018-106495 dated Aug. 25, 2020.
Office Action for CN App. No. 201680068288.3, dated Feb. 26, 2021 (w/ translation).

* cited by examiner

MODIFIER, USAGE THEREFOR, PRODUCTION METHOD FOR MODIFIER, AND CARRIER FOR ADDITIVE MATERIAL

This application is a divisional of U.S. application Ser. No. 15/776,867, which is the U.S. national stage of PCT/JP2016/085453 filed Nov. 29, 2016, which claims priority to JP 2015-235171 filed Dec. 1, 2015. The disclosures of each of these applications are herein incorporated by reference in their entirety.

TECHNICAL FIELD

The present invention relates to a modifier and a method for using the same, a method for producing the modifier, and a carrier for additives. More specifically, the present invention relates to a modifier that can be added to a polyolefin resin to obtain a molded body having improved impact resistance and a method for using the same, a method for producing the modifier, and a carrier for additives.

BACKGROUND ART

Heretofore, attempts have been made to mix different types of resins to obtain mixed resins that can offer characteristics superior to those that are offered by each of the resins alone. For example, a technique is disclosed by the present inventors in the following Patent Literatures 1 to 4, in which a polyamide resin and a polyolefin resin are used in combination to obtain a mixed resin having improved characteristics.

CITATIONS LIST

Patent Literatures

Patent Literature 1: JP 2013-147645 A
Patent Literature 2: JP 2013-147646 A
Patent Literature 3: JP 2013-147647 A
Patent Literature 4: JP 2013-147648 A

SUMMARY OF INVENTION

Technical Problems

Patent Literature 1 discloses a polymer alloy of a polyamide resin and a polyolefin resin (thermoplastic resin composition) obtained by using, as a compatibilizer, a modified elastomer having a reactive group capable of reacting with the polyamide resin.

Patent Literature 2 discloses that a plant-derived polyamide resin can be used as a polyamide resin contained in a polymer alloy of a polyamide resin and a polyolefin resin.

Patent Literature 3 discloses a polymer alloy containing a polyamide resin and a polyolefin resin, which has a resin phase-separated structure having a continuous phase, a dispersed phase dispersed in the continuous phase, and a fine dispersed phase further dispersed in the dispersed phase.

Patent Literature 4 discloses that a polymer alloy excellent in impact resistance can be obtained by first melt-mixing a polyamide resin and a compatibilizer and then further melt-mixing the obtained mixed resin and a polyolefin resin.

However, according to the above Patent Literatures 1 to 4, the present inventors have studied the production and use of these polymer alloys alone, but have not studied the use of these polymer alloys together with other resins.

In light of the above circumstances, it is an object of the present invention to provide a modifier that contains a polyamide resin and a polyolefin resin and that can be blended with a polyolefin resin to obtain a molded body having excellent impact resistance and a method for using the same and a method for producing the modifier.

Solutions to Problems

The present invention is as follows.

Aspect 1 of the present invention is directed to a modifier that can be added to a first polyolefin resin to obtain a molded body having improved impact resistance, the modifier including:

a continuous phase (A) containing a second polyolefin resin; and a dispersed phase (B) dispersed in the continuous phase (A) and containing a polyamide resin and a modified elastomer, wherein the dispersed phase (B) is composed of a melt-kneaded product of the polyamide resin and the modified elastomer having a reactive group that reacts with the polyamide resin, and wherein when a total of the continuous phase (A) and the dispersed phase (B) is 100% by mass, a content of the dispersed phase (B) is 80% by mass or less.

A modifier according to aspect 2 is the modifier according to aspect 1, wherein the modified elastomer is an olefin-based thermoplastic elastomer having, as its skeleton, a copolymer of ethylene or propylene and an α-olefin having 3 to 8 carbon atoms, or a styrene-based thermoplastic elastomer having a styrene skeleton.

A modifier according to aspect 3 is the modifier according to aspect 1 or 2, wherein when a total of the polyamide resin and the modified elastomer is 100% by mass, a content of the polyamide resin is 10% by mass or more but 80% by mass or less.

A modifier according to aspect 4 is the modifier according to any one of aspects 1 to 3, wherein the dispersed phase (B) has a continuous phase ($B_1$) containing the polyamide resin and a fine dispersed phase ($B_2$) dispersed in the continuous phase ($B_1$) and containing the modified elastomer.

A modifier according to aspect 5 is the modifier according to any one of aspects 1 to 4, wherein the first polyolefin resin is a block copolymerized polyolefin resin having an ethylene block as a dispersed phase.

The present invention is also directed to a method for using the modifier according to aspect 1, including mixing 0.5 parts by mass or more but 70 parts by mass or less of the modifier per 100 parts by mass of the first polyolefin resin.

The present invention is also directed to a method for producing the modifier according to aspect 1, including a melt-kneading step in which the second polyolefin resin and a melt-kneaded product of the polyamide resin and the modified elastomer are melt-kneaded.

The present invention is also directed to a carrier for additives for use in adding an additive to a first polyolefin resin, the carrier including:

a continuous phase (A) containing a second polyolefin resin, and a dispersed phase (B) dispersed in the continuous phase (A) and containing a polyamide resin and a modified elastomer, wherein the dispersed phase (B) is composed of a melt-kneaded product of the polyamide resin and the modified elastomer having a reactive group that reacts with the polyamide resin, and wherein when a total of the continuous phase (A) and the dispersed phase (B) is 100% by mass, a content of the dispersed phase (B) is 80% by mass or less.

A carrier for additives according to aspect 9 is the carrier for additives according to aspect 8, wherein the additive is at least one of a flame retardant, a flame retardant aid, a filler, a colorant, an antimicrobial agent, an antistatic agent, and a foaming agent.

Advantageous Effects of Invention

When the modifier according to the present invention is blended with a first polyolefin resin, a thermoplastic resin composition having excellent impact resistance and a pellet mixture can be obtained, and further a molded body can be obtained using the thermoplastic resin composition or the pellet mixture.

When the modified elastomer is an olefin-based thermoplastic elastomer having, as its skeleton, a copolymer of ethylene or propylene and an α-olefin having 3 to 8 carbon atoms or a styrene-based thermoplastic elastomer having a styrene skeleton, a specific phase structure can be more reliably obtained, and therefore a thermoplastic resin composition having excellent impact resistance and a pellet mixture can be obtained, and further a molded body can be obtained using the thermoplastic resin composition or the pellet mixture.

When the total of the polyamide resin and the modified elastomer is 100% by mass and the content of the polyamide resin is 10% by mass or more but 80% by mass or less, a specific phase structure can be more stably obtained, and therefore a thermoplastic resin composition having excellent impact resistance and a pellet mixture can be obtained, and further a molded body can be obtained using the thermoplastic resin composition or the pellet mixture.

When the dispersed phase (B) has a continuous phase ($B_1$) containing the polyamide resin and a fine dispersed phase ($B_2$) dispersed in the continuous phase ($B_1$) and containing the modified elastomer, a multiple phase structure is formed, and therefore a thermoplastic resin composition having more excellent impact resistance and a pellet mixture can be obtained, and further a molded body can be obtained using the thermoplastic resin composition or the pellet mixture.

When the first polyolefin resin is a block copolymerized polyolefin resin having an ethylene block as a dispersed phase, and at least part of the ethylene block is aggregated at the interface between the continuous phase (A) and the dispersed phase (B), a multiple phase structure is formed, and therefore a thermoplastic resin composition having excellent impact resistance and a pellet mixture can be obtained, and further a molded body can be obtained using the thermoplastic resin composition or the pellet mixture.

According to the method for using the modifier of the present invention and the method for producing the modifier of the present invention, the first polyolefin resin is modified so that a thermoplastic resin composition having excellent impact resistance and a pellet mixture can be obtained, and further a molded body can be obtained using the thermoplastic resin composition or the pellet mixture. Further, since the component that imparts impact resistance is prepared separately from the first polyolefin resin, a molded body can be obtained by applying a heat load to the first polyolefin resin only once during molding, which results in a reduction in the heat history of the molded body.

The carrier for additives according to the present invention makes it possible to blend an additive with the first polyolefin resin at an accurate ratio and to obtain a thermoplastic resin composition and a molded body that have improved impact resistance.

DESCRIPTION OF EMBODIMENTS

Figure 1:
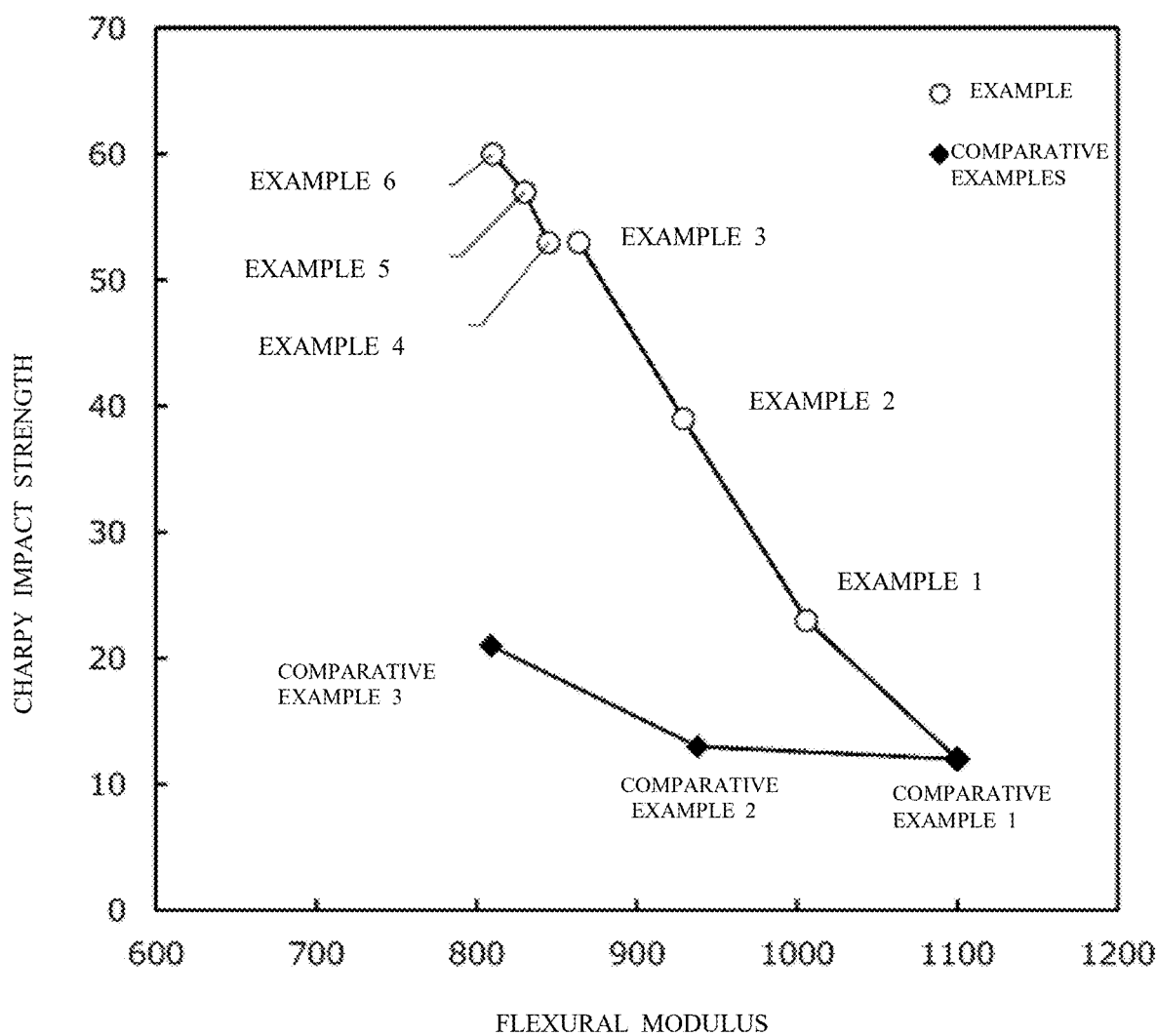
FIG. 1 is a graph showing a correlation between Charpy impact strength and flexural modulus of each of the test specimens for evaluation of Examples 1 to 3 and Comparative Examples 1 to 3.

The particulars shown herein are by way of example and for purposes of illustrative discussion of embodiments of the present invention, and are presented in the cause of providing what is believed to be the most useful and readily understood description of the principles and conceptual aspects of the present invention. In this regard, no attempt is made to show structural details of the present invention in more detail than is necessary for a fundamental understanding of the present invention, and the description taken with the drawings makes apparent to those skilled in the art how the several forms of the present invention may be embodied in practice.

A modifier according to the present invention is a modifier that can be added to a first polyolefin resin to obtain a molded body having improved impact resistance, the modifier including:

a continuous phase (A) containing a second polyolefin resin, and a dispersed phase (B) dispersed in the continuous phase (A) and containing a polyamide resin and a modified elastomer, wherein the dispersed phase (B) is composed of a melt-kneaded product of the polyamide resin and the modified elastomer having a reactive group that reacts with the polyamide resin, and wherein when a total of the continuous phase (A) and the dispersed phase (B) is 100% by mass, a content of the dispersed phase (B) is 80% by mass or less.

Further, when the modifier is blended with the first polyolefin resin, a thermoplastic resin composition that is a modified polyolefin resin-based composition can be obtained. Further, when this thermoplastic resin composition is molded, a modified molded body can be obtained. Further, when the first polyolefin resin is molded together with the modifier (e.g., when a dry blend of pellets is molded), a modified molded body can be obtained. In any case, as described above, the modifier can finally modify a resulting molded body.

A thermoplastic resin composition obtained using the modifier and a molded body using the same have a continuous phase (A') containing a first polyolefin resin and a second polyolefin resin and a dispersed phase (B) dispersed in the continuous phase (A') and containing a polyamide resin and a modified elastomer, wherein the dispersed phase (B) is composed of a melt-kneaded product of the polyamide resin and the modified elastomer having a reactive group that reacts with the polyamide resin.

[1] Modifier (1) Second Polyolefin Resin

The "second polyolefin resin" (hereinafter, also simply referred to as a "second polyolefin") is an olefin homopolymer and/or an olefin copolymer. In the modifier, this second polyolefin resin is contained in the continuous phase (A) and forms the continuous phase (A). Further, in the thermoplastic resin composition obtained using the modifier and the molded body, the second polyolefin resin is contained in the continuous phase (A') together with the first polyolefin resin and forms the continuous phase (A').

An olefin constituting the second polyolefin is not particularly limited, and examples thereof include ethylene, propylene, 1-butene, 3-methyl-1-butene, 1-pentene, 3-methyl-1-pentene, 4-methyl-1-pentene, 1-hexene, and 1-octene. These olefins may be used singly or in combination of two or more of them.

Specific examples of the polyolefin resin include a polyethylene resin, a polypropylene resin, poly-1-butene, poly-1-hexene, and poly-4-methyl-1-pentene. These polymers may be used singly or in combination of two or more of them. That is, the polyolefin resin may be a mixture of two or more of the above polymers.

Examples of the polyethylene resin include an ethylene homopolymer and a copolymer of ethylene and another olefin. Examples of the latter include an ethylene-1-butene copolymer, an ethylene-1-hexene copolymer, an ethylene-1-octene copolymer, and an ethylene-4-methyl-1-pentene copolymer (the content of an ethylene-derived structural unit is 50% or more of the total structural units).

Examples of the polypropylene resin include a propylene homopolymer and a copolymer of propylene and another olefin.

Examples of another olefin constituting the copolymer of propylene and another olefin include the above-mentioned various olefins (except for propylene). Among them, for example, ethylene and 1-butene are preferred. That is, the copolymer of propylene and another olefin is preferably a propylene-ethylene copolymer or a propylene-1-butene copolymer.

Further, the copolymer of propylene and another olefin may be either a random copolymer or a block copolymer. Among them, a block copolymer is preferred in terms of excellent impact resistance. Particularly, a propylene-ethylene block copolymer having ethylene as another olefin is preferred. This propylene-ethylene block copolymer is a block copolymerized polypropylene having an ethylene block as a dispersed phase. More specifically, the propylene-ethylene block copolymer is a polypropylene resin having a continuous phase composed of homopolypropylene and a dispersed phase present in the continuous phase and containing polyethylene. Such a block copolymerized polypropylene having an ethylene block as a dispersed phase is also called, for example, an impact copolymer, a polypropylene impact copolymer, a heterophasic polypropylene, or a heterophasic block polypropylene. This block copolymerized polypropylene is preferred in terms of excellent impact resistance.

It is to be noted that the content of a propylene-derived structural unit of the copolymer of propylene and another olefin is 50% or more of the total structural units.

The weight-average molecular weight (based on polystyrene standards) of the second polyolefin resin measured by gel permeation chromatography (GPC) is not particularly limited, and may be, for example, 10,000 or more but 500,000 or less, but is preferably 100,000 or more but 450,000 or less, more preferably 200,000 or more but 400,000 or less.

It is to be noted that the second polyolefin resin are polyolefins that have no affinity for the polyamide resin, which will be described later, and that have no reactive group capable of reacting with the polyamide resin, either. The first and second polyolefin resins are different in this point from an olefin-based component as the modified elastomer that will be described later.

(2) Polyamide Resin

The "polyamide resin" is a polymer having a chain-like skeleton formed by polymerizing a plurality of monomers via amide bonds (—NH—CO—). In the modifier, this polyamide resin is contained in the dispersed phase (B) together with the modified elastomer. Further, in the thermoplastic resin composition obtained using the modifier and the molded body, the polyamide resin forms the dispersed phase (B) in the continuous phase (A') containing both the first and second polyolefin resins.

Examples of a monomer constituting the polyamide resin include: amino acids such as 6-aminocaproic acid, 11-aminoundecanoic acid, 12-aminododecanoic acid, and para-aminomethylbenzoic acid; and lactams such as ε-caprolactam, undecane lactam, and ω-lauryllactam. These monomers may be used singly or in combination of two or more of them.

Further, the polyamide resin can be obtained also by copolymerization of a diamine and a dicarboxylic acid. In this case, examples of the diamine as a monomer include: aliphatic diamines such as ethylenediamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; alicyclic diamines such as cyclohexanediamine and bis-(4-aminocyclohexyl) methane; and aromatic diamines such as xylylenediamines (e.g., p-phenylenediamine and m-phenylenediamine). These diamines may be used singly or in combination of two or more of them.

Further, examples of the dicarboxylic acid as a monomer include: aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanedioic acid, and octadecanedioic acid; alicyclic dicarboxylic acids such as cyclohexanedicarboxylic acids; and aromatic dicarboxylic acids such as phthalic acid, terephthalic acid, isophthalic acid, and naphthalene dicarboxylic acid. These dicarboxylic acids may be used singly or in combination of two or more of them.

Specific examples of the polyamide resin include polyamide 6, polyamide 66, polyamide 11, polyamide 610, polyamide 612, polyamide 614, polyamide 12, polyamide 6T, polyamide 6I, polyamide 9T, polyamide M5T, polyamide 1010, polyamide 1012, polyamide 10T, polyamide MXD6, polyamide 6T/66, polyamide 6T/6I, polyamide 6T/6I/66, polyamide 6T/2M-5T, and polyamide 9T/2M-8T. These polyamides may be used singly or in combination of two or more of them.

In the present invention, among the above-described various polyamide resins, plant-derived polyamide resins can be used. Plant-derived polyamide resins are preferred from the viewpoint of environmental protection (particularly from the viewpoint of carbon neutral) because they are resins using monomers derived from plant-derived components such as vegetable oils.

Examples of the plant-derived polyamide resins include polyamide 11 (hereinafter, also simply referred to as "PA11"), polyamide 610 (hereinafter, also simply referred to as "PA610"), polyamide 612 (hereinafter, also simply referred to as "PA612"), polyamide 614 (hereinafter, also simply referred to as "PA614"), polyamide 1010 (hereinafter, also simply referred to as "PA1010"), polyamide 1012 (hereinafter, also simply referred to as "PA1012"), and polyamide 10T (hereinafter, also simply referred to as "PA10T"). These plant-derived polyamide resins may be used singly or in combination of two or more of them.

Among the above, PA11 has a structure in which monomers having 11 carbon atoms are linked via amide bonds. PA11 can be obtained using aminoundecanoic acid derived from castor oil as a monomer. The content of a structural unit derived from the monomer having 11 carbon atoms in PA11 is preferably 50% or more or may be 100% of all the structural units of PA11.

PA610 has a structure in which monomers having 6 carbon atoms and monomers having 10 carbon atoms are linked via amide bonds. PA610 can be obtained using sebacic acid derived from castor oil as a monomer. The total content of a structural unit derived from the monomer having 6 carbon atoms and a structural unit derived from the monomer having 10 carbon atoms in PA610 is preferably 50% or more or may be 100% of all the structural units of PA610.

PA1010 has a structure in which a diamine having 10 carbon atoms and a dicarboxylic acid having 10 carbon atoms are copolymerized. PA1010 can be obtained using 1,10-decanediamine (decamethylenediamine) and sebacic acid, which are derived from castor oil, as monomers. The total content of a structural unit derived from the diamine having 10 carbon atoms and a structural unit derived from the dicarboxylic acid having 10 carbon atoms in PA1010 is preferably 50% or more or may be 100% of all the structural units of PA1010.

PA614 has a structure in which monomers having 6 carbon atoms and monomers having 14 carbon atoms are linked via amide bonds. PA614 can be obtained using a plant-derived dicarboxylic acid having 14 carbon atoms as a monomer. The total content of a structural unit derived from the monomer having 6 carbon atoms and a structural unit derived from the monomer having 14 carbon atoms in PA614 is preferably 50% or more or may be 100% of all the structural units of PA614.

PA10T has a structure in which a diamine having 10 carbon atoms and terephthalic acid are linked via amide bonds. PA10T can be obtained using 1,10-decanediamine (decamethylenediamine) derived from castor oil as a monomer. The total content of a structural unit derived from the diamine having 10 carbon atoms and a structural unit derived from terephthalic acid is preferably 50% or more or may be 100% of all the structural units of PA10T.

Among the above five plant-derived polyamide resins, PA11 is superior to the other four plant-derived polyamide resins in terms of low water absorbability, low specific gravity, and high biomass degree.

Polyamide 610 is inferior to PA11 in water absorption rate, chemical resistance, and impact strength, but is excellent in heat resistance (melting point) and rigidity (strength). Further, polyamide 610 is superior to polyamide 6 or polyamide 66 in terms of low water absorbability and excellent size stability, and therefore can be used as an alternative to polyamide 6 or polyamide 66.

Polyamide 1010 is superior to PA11 in heat resistance and rigidity. Further, the biomass degree of polyamide 1010 is comparable to that of PA11, and therefore polyamide 1010 can be used for parts required to have higher durability.

Polyamide 10T has an aromatic ring in its molecular framework, and therefore has a higher melting point and higher rigidity than polyamide 1010. Therefore, polyamide 10T can be used in harsh environments (parts required to have heat resistance, parts on which a force is to be exerted).

(3) Modified Elastomer

The "modified elastomer" is an elastomer having a reactive group that reacts with the polyamide resin. In the modifier, this modified elastomer is contained in the dispersed phase (B) together with the polyamide resin.

Further, in the thermoplastic resin composition obtained using the modifier and the molded body, the modified elastomer forms the dispersed phase (B) together with the polyamide resin in the continuous phase (A') containing both the first and second polyolefin resins.

Further, the modified elastomer is preferably a component having an affinity for the second polyolefin resin. More specifically, the modified elastomer preferably has compatibilizing effect on the polyamide resin and the second polyolefin resin. In other words, the modified elastomer is preferably a compatibilizer for the polyamide resin and the second polyolefin resin.

Examples of the reactive group include an acid anhydride group (—CO—O—OC—), a carboxyl group (—COOH), an epoxy group {—C$_2$O (a three-membered ring structure composed of two carbon atoms and one oxygen atom)}, an oxazoline group (—C$_3$H$_4$NO), and an isocyanate group (—NCO). These reactive groups may be used singly or in combination of two or more of them.

The amount of modification of the modified elastomer is not limited, and the modified elastomer only needs to have one or more reactive groups per molecule. Further, the modified elastomer preferably has 1 or more but 50 or less reactive groups, more preferably 3 or more but 30 or less reactive groups, particularly preferably 5 or more but 20 or less reactive groups per molecule.

Examples of the modified elastomer include: a polymer using any monomer capable of introducing a reactive group (a modified elastomer obtained by polymerization using a monomer capable of introducing a reactive group); an oxidative degradation product of any polymer (a modified elastomer having a reactive group formed by oxidative degradation), and a graft polymer obtained by graft polymerization of an organic acid on any polymer (a modified elastomer having a reactive group introduced by graft polymerization of an organic acid). These modified elastomers may be used singly or in combination of two or more of them. These modified elastomers may be used singly or in combination of two or more of them.

Examples of the monomer capable of introducing a reactive group include: a monomer having a polymerizable unsaturated bond and an acid anhydride group; a monomer having a polymerizable unsaturated bond and a carboxyl group; and a monomer having a polymerizable unsaturated bond and an epoxy group.

Specific examples thereof include: acid anhydrides such as maleic anhydride, itaconic anhydride, succinic anhydride, glutaric anhydride, adipic anhydride, citraconic anhydride, tetrahydrophthalic anhydride, butenyl succinic anhydride; and carboxylic acids such as maleic acid, itaconic acid, fumaric acid, acrylic acid, and methacrylic acid. These compounds may be used singly or in combination of two or more of them. Among these compounds, an acid anhydride is preferred, maleic anhydride and itaconic anhydride are more preferred, and maleic anhydride is particularly preferred.

Further, the type of resin constituting the skeleton of the modified elastomer (hereinafter, referred to as a "skeletal resin") is not particularly limited, and various thermoplastic resins can be used. As this skeletal resin, one or two or more of the various resins mentioned above as examples of the polyolefin resin can be used.

In addition, the skeletal resin may be an olefin-based thermoplastic elastomer or a styrene-based thermoplastic elastomer. These thermoplastic elastomers may be used singly or in combination of two or more of them.

Examples of the olefin-based thermoplastic elastomer include copolymers of two or more of olefins.

Examples of the olefins include ethylene, propylene, and α-olefins having 4 to 8 carbon atoms. Examples of the α-olefin having 4 to 8 carbon atoms include 1-butene, 3-methyl-1-butene, 1-pentene, 3-methyl-1-pentene, 4-methyl-1-pentene, 1-hexene, and 1-octene. Among such olefin-based thermoplastic elastomers, a copolymer of ethylene and an α-olefin having 3 to 8 carbon atoms and a copolymer of propylene and an α-olefin having 4 to 8 carbon atoms are preferred.

Specific examples of the copolymer of ethylene and an α-olefin having 3 to 8 carbon atoms include ethylene-propylene copolymers (EPR), ethylene-1-butene copolymers (EBR), ethylene-1-pentene copolymers, and ethylene-1-octene copolymers (EOR). Specific examples of the copolymer of propylene and an α-olefin having 4 to 8 carbon atoms include propylene-1-butene copolymers (PBR), propylene-1-pentene copolymers, and propylene-1-octene copolymers (POR). These copolymers may be used singly or in combination of two or more of them.

On the other hand, examples of the styrene-based thermoplastic elastomer include: a block copolymer of a styrene-based compound and a conjugated diene compound; and a hydrogenated product thereof.

Examples of the styrene-based compound include: styrene; alkylstyrenes such as α-methylstyrene, p-methylstyrene, and p-t-butylstyrene; p-methoxystyrene; and vinylnaphthalene. These styrene-based compounds may be used singly or in combination of two or more of them.

Examples of the conjugated diene compound include butadiene, isoprene, piperylene, methylpentadiene, phenylbutadiene, 3,4-dimethyl-1,3-hexadiene, and 4,5-diethyl-1,3-octadiene. These conjugated diene compounds may be used singly or in combination of two or more of them.

Specific examples of the styrene-based thermoplastic elastomer include styrene-butadiene-styrene copolymers (SBS), styrene-isoprene-styrene copolymers (SIS), styrene-ethylene/butylene-styrene copolymers (SEBS), and styrene-ethylene/propylene-styrene copolymers (SEPS). These styrene-based thermoplastic elastomers may be used singly or in combination of two or more of them. Among them, SEBS is preferred.

The molecular weight of the modified elastomer is not particularly limited, but the weight-average molecular weight of the modified elastomer is preferably 10,000 or more but 500,000 or less, more preferably 35,000 or more but 500,000 or less, particularly preferably 35,000 or more but 300,000 or less. It is to be noted that the weight-average molecular weight is measured by a GPC method (based on polystyrene standards).

(4) Other Components that May be Contained in Modifier

The modifier may contain, in addition to the second polyolefin resin, the polyamide resin, and the modified elastomer, other components such as another thermoplastic resin. The other components may be used singly or in combination of two or more of them.

Examples of another thermoplastic resin include polyester-based resins (polybutylene terephthalate, polyethylene terephthalate, polycarbonate, polybutylene succinate, polyethylene succinate, and polylactic acid). These thermoplastic resins may be used singly or in combination of two or more of them.

(5) Phase Structure of Modifier

In the modifier, the second polyolefin resin forms a continuous phase (A). Further, the polyamide resin and the modified elastomer form a dispersed phase (B). The dispersed phase (B) is dispersed in the continuous phase (A). Such a phase structure can be obtained as a thermoplastic resin obtained by melt-kneading the second polyolefin resin and a melt-kneaded product of the polyamide resin and the modified elastomer.

Further, in the modifier, the polyamide resin constituting the dispersed phase (B), which is composed of the polyamide resin and the modified elastomer, forms a continuous phase ($B_1$) in the dispersed phase (B), and at least the modified elastomer out of the polyamide resin and the modified elastomer can form a fine dispersed phase ($B_2$) in the dispersed phase (B). When having such a multiple phase structure in which a fine dispersed phase ($B_2$) is present in a dispersed phase (B), the thermoplastic resin composition and the molded body can have more excellent impact resistance.

Further, in the modifier, when the second polyolefin resin is a block copolymerized polyolefin resin having an ethylene block as a dispersed phase, at least part of the ethylene block constituting the block copolymerized polyolefin resin can be aggregated at the interface between the continuous phase (A) and the dispersed phase (B) in the molded body. Also when having such a phase structure, the thermoplastic resin composition and the molded body can have more excellent impact resistance.

The size of the dispersed phase (B) contained in the continuous phase (A) of the modifier is not particularly limited, but the average diameter (average particle diameter) of the dispersed phase (B) is preferably 10000 nm or less, more preferably 50 nm or more but 8000 nm or less, even more preferably 100 nm or more but 4000 nm or less. The average diameter of the dispersed phase (B) is the average of maximum lengths (nm) of 50 particles of the dispersed phase (B) randomly selected on an image obtained using an electron microscope.

The size of the fine dispersed phase ($B_2$) contained in the dispersed phase (B) of the modifier is not particularly limited, but the average diameter (average particle diameter) of the fine dispersed phase ($B_2$) is preferably 5 nm or more but 1000 nm or less, more preferably 5 nm or more but 600 nm or less, even more preferably 10 nm or more but 400 nm or less, particularly preferably 15 nm or more but 350 nm or less. The average diameter of the fine dispersed phase ($B_2$) is the average of maximum lengths (nm) of 100 particles of the fine disperse phases ($B_2$) randomly selected on an image obtained using an electron microscope.

(6) Blending Ratio

When the total of the continuous phase (A) and the dispersed phase (B) in the modifier is 100% by mass, the content of the dispersed phase (B) is 80% by mass or less. More specifically, when the amount of the second polyolefin resin is defined as $W_A$, the total amount of the polyamide resin and the modified elastomer is defined as $W_B$, and the total of $W_A$ and $W_B$ is 100% by mass, the ratio of $W_B$ is usually 80% by mass or less (usually 0.5% by mass or more). When the ratio of $W_B$ is within the above range, excellent impact resistance and an excellent balance between rigidity and moldability can be achieved. The ratio of $W_B$ is preferably 5% by mass or more but 78% by mass or less, more preferably 10% by mass or more but 77% by mass or less, even more preferably 23% by mass or more but 76% by mass or less, even still more preferably 30% by mass or more but 75% by mass or less, particularly preferably 33% by mass or more but 72% by mass or less, more particularly preferably 35% by mass or more but 67% by mass or less, even more particularly preferably 37% by mass or more but 63% by mass or less.

In addition, when the total of the polyamide resin and the modified elastomer is 100% by mass, the content of the polyamide resin may be 10% by mass or more but 80% by mass or less. When the content of the polyamide resin is within the above range, a phase structure can be obtained in which the second polyolefin resin forms a continuous phase (A) and the polyamide resin forms a dispersed phase (B). This makes it possible to obtain a thermoplastic resin composition and a molded body that offer excellent impact resistance and excellent rigidity. The content of the polyamide resin is preferably 12% by mass or more but 78% by mass or less, more preferably 14% by mass or more but 75% by mass or less, even more preferably 25% by mass or more but 73% by mass or less, even more preferably 30% by mass or more but 71% by mass or less, particularly preferably 34% by mass or more but 68% by mass or less, more particularly preferably 40% by mass or more but 64% by mass or less. When the content of the polyamide resin is within the above range, the polyamide resin and the modified elastomer can be dispersed as smaller particles of the dispersed phase (B) in the continuous phase (A). Further, the amount of the polyamide resin, which has a large specific gravity, to be used can be reduced to reduce the specific gravity of the thermoplastic resin composition and the molded body. This allows the thermoplastic resin composition and the molded body to have excellent impact resistance and rigidity while being lightweight.

Further, as described above, since the content of the polyamide resin can be reduced while the mechanical characteristics are well maintained, the thermoplastic resin composition and the molded body can have relaxing appearance with low surface luster. Therefore, the molded body can be applied to exterior and interior materials that are directly visually recognized, and can offer excellent design flexibility.

It is to be noted that from the viewpoint of obtaining a polyamide rich-type modifier whose polyamide resin content is 50% by mass or more, the content of the polyamide resin may be 50% by mass or more but 80% by mass or less when the total of the polyamide resin and the modified elastomer is 100% by mass.

Further, when the total of the second polyolefin resin and the polyamide resin is 100% by mass, the content of the polyamide resin may be 60% by mass or less (usually 1% by mass or more). The content of the polyamide resin is preferably 5% by mass or more but 55% by mass or less, more preferably 15% by mass or more but 53% by mass or less, even more preferably 19% by mass or more but 50% by mass or less, even still more preferably 21% by mass or more but 48% by mass or less, particularly preferably 23% by mass or more but 46% by mass or less, more particularly preferably 25% by mass or more but 44% by mass or less, even more particularly preferably 28% by mass or more but 43% by mass or less.

Further, when the total of the second polyolefin resin, the polyamide resin, and the modified elastomer is 100% by mass, the content of the polyamide resin may be 1% by mass or more but 60% by mass or less. The content of the polyamide resin is preferably 3% by mass or more but 50% by mass or less, more preferably 5% by mass or more but 45% by mass or less, even more preferably 7% by mass or more but 40% by mass or less, even more preferably 9% by mass or more but 35% by mass or less, particularly preferably 12% by mass or more but 30% by mass or less.

Further, when the total of the second polyolefin resin, the polyamide resin, and the modified elastomer is 100% by mass, the content of the modified elastomer may be 1% by mass or more but 70% by mass or less. When the content of the modified elastomer is within the above range, a thermoplastic resin composition and a molded body that have excellent impact resistance and excellent rigidity can be obtained. The content of the modified elastomer is preferably 2% by mass or more but 65% by mass or less, more preferably 3% by mass or more but 60% by mass or less, even more preferably 5% by mass or more but 55% by mass or less, even still more preferably 7% by mass or more but 50% by mass or less, particularly preferably 13% by mass or more but 47% by mass or less, more particularly preferably 17% by mass or more but 45% by mass or less.

[2] Thermoplastic Resin Composition and Molded Body

The modifier can be added to a first polyolefin resin to obtain a thermoplastic resin composition and a molded body. The modifier can improve the impact resistance of the thus obtained thermoplastic resin composition and molded body.

(1) First Polyolefin Resin

The "first polyolefin resin" (hereinafter, also simply referred to as a "first polyolefin") is an olefin homopolymer and/or an olefin copolymer. In the thermoplastic resin composition obtained using the modifier and the molded body, the first polyolefin resin is contained in the continuous phase (A') together with the second polyolefin resin and forms the continuous phase (A').

An olefin constituting the first polyolefin is not particularly limited, and examples thereof include the same olefins as mentioned above with reference to the second polyolefin.

The weight-average molecular weight (based on polystyrene standards) of the first polyolefin resin measured by gel permeation chromatography (GPC) is not particularly limited, and may be, for example, 10,000 or more but 500,000 or less, but is preferably 100,000 or more but 450,000 or less, more preferably 200,000 or more but 400,000 or less.

It is to be noted that the first polyolefin resin is a polyolefin that has no affinity for the above-described polyamide resin and that has no reactive group capable of reacting with the polyamide resin, either. The first polyolefin resin is different in this point from an olefin-based component as the above-described modified elastomer.

The first polyolefin and the second polyolefin may be the same resin or different resins.

When the first polyolefin and the second polyolefin are different resins, for example, one of the first polyolefin and the second polyolefin is a block copolymerized polyolefin resin (e.g., a block copolymerized polypropylene resin) having an ethylene block as a dispersed phase, and the other is a non-block copolymerized polyolefin resin.

In this case, in terms of impact resistance, it is preferred that the first polyolefin be a block copolymerized polypropylene resin having an ethylene block as a dispersed phase, and the second polyolefin be a non-block copolymerized polyolefin resin. Further, the non-block copolymerized polyolefin resin is preferably a homopolypropylene resin.

In the above described case where the first polyolefin is a block copolymerized polypropylene resin having an ethylene block as a dispersed phase, and the second polyolefin is a non-block copolymerized polypropylene resin, the thermoplastic resin composition obtained using the modifier and the molded body have a continuous phase (A') formed of homopolypropylene constituting the first polypropylene resin and the second polypropylene resin, a dispersed phase (B) dispersed in the continuous phase (A') and containing the polyamide resin and the modified elastomer, and a dispersed phase (B') composed of the ethylene block constituting the first polypropylene resin. In addition, at least part of the ethylene block is aggregated at the interface between the continuous phase (A') and the dispersed phase (B). This allows the thermoplastic resin composition and the molded body to offer particularly excellent impact resistance.

(2) Other Components that May be Contained in Thermoplastic Resin Composition and Molded Body The thermoplastic resin composition obtained using the modifier and the molded body may contain, in addition to the first polyolefin resin, the second polyolefin resin, the polyamide resin, and the modified elastomer, various additives such as another thermoplastic resin, a flame retardant, a flame retardant aid, a filler, a colorant, an antimicrobial agent, and an antistatic agent. These additives may be used singly or in combination of two or more of them.

Examples of another thermoplastic resin include polyester-based resins (polybutylene terephthalate, polyethylene terephthalate, polycarbonate, polybutylene succinate, polyethylene succinate, and polylactic acid). These thermoplastic resins may be used singly or in combination of two or more of them.

Examples of the flame retardant include halogen-based flame retardants (halogenated aromatic compounds), phosphorus-based flame retardants (e.g., nitrogen-containing phosphate compounds, phosphoric acid esters), nitrogen-based flame retardants (e.g., guanidine, triazine, melamine, and derivatives thereof), inorganic flame retardants (e.g., metal hydroxides), boron-based flame retardants, silicone-based flame retardants, sulfur-based flame retardants, and red phosphorus-based flame retardants. These flame retardants may be used singly or in combination of two or more of them.

Examples of the flame retardant aid include various antimony compounds, metal compounds containing zinc, metal compounds containing bismuth, magnesium hydroxide, and clayey silicate. These flame retardant aids may be used singly or in combination of two or more of them.

Examples of the filler include: glass components (e.g., glass fibers, glass beads, glass flakes); silica; inorganic fibers (glass fibers, alumina fibers, carbon fibers); graphite; silicate compounds (e.g., calcium silicate, aluminum silicate, kaolin, talc, clay); metal oxides (e.g., iron oxide, titanium oxide, zinc oxide, antimony oxide, alumina); carbonates and sulfates of metals such as calcium, magnesium, and zinc; and organic fibers (e.g., aromatic polyester fibers, aromatic polyamide fibers, fluororesin fibers, polyimide fibers, vegetable fibers). These fillers may be used singly or in combination of two or more of them.

Examples of the colorant include pigments and dyes. These colorants may be used singly or in combination of two or more of them.

(3) Phase Structure of Thermoplastic Resin Composition and Molded Body

In the thermoplastic resin composition obtained using the modifier and the molded body, the first polyolefin resin and the second polyolefin resin form a continuous phase (A'). That is, the modifier has a continuous phase (A) containing the second polyolefin, but in the thermoplastic resin composition and the molded body, the first polyolefin resin and the continuous phase (A) are integrated to form a continuous phase (A').

On the other hand, the polyamide resin and the modified elastomer usually form a dispersed phase (B) as in the case of the inside of the modifier. That is, the dispersed phase (B) is dispersed in the continuous phase (A'). This phase structure is obtained by molding a thermoplastic resin that is a mixture of the modifier and the first polyolefin resin.

Further, in the thermoplastic resin composition obtained using the modifier and the molded body, the polyamide resin constituting the dispersed phase (B), which is composed of the polyamide resin and the modified elastomer, forms a continuous phase ($B_1$) in the dispersed phase (B), and at least the modified elastomer out of the polyamide resin and the modified elastomer can form a fine dispersed phase ($B_2$) in the dispersed phase (B). When having such a multiple phase structure in which a fine dispersed phase ($B_2$) is further present in a dispersed phase (B), the thermoplastic resin composition and the molded body can have more excellent impact resistance. When already formed in the modifier, the multiple phase structure is basically maintained also in the thermoplastic resin composition obtained using the modifier and the molded body.

Further, when the first polyolefin resin is a block copolymerized polyolefin resin having an ethylene block as a dispersed phase, at least part of the ethylene block constituting the block copolymerized polyolefin resin can be aggregated at the interface between the continuous phase (A') and the dispersed phase (B) in the thermoplastic resin composition obtained using the modifier and the molded body. Also, when having such a phase structure, the thermoplastic resin composition and the molded body can have more excellent impact resistance.

The size of the dispersed phase (B) contained in the continuous phase (A') of the thermoplastic resin composition obtained using the modifier and the molded body is not particularly limited, but is usually the same as that of the dispersed phase (B) in the modifier described above.

Further, when the fine dispersed phase ($B_2$) is contained in the dispersed phase (B) of the thermoplastic resin composition obtained using the modifier and the molded body, the size of the fine dispersed phase ($B_2$) is not particularly limited, but is usually the same as that of the fine disperse phase ($B_2$) in the modifier described above.

(4) Blending Ratio

When the total of the continuous phase (A') and the dispersed phase (B) in the thermoplastic resin composition obtained using the modifier and the molded body is 100% by mass, the content of the dispersed phase (B) is 80% by mass or less. More specifically, when the total amount of the first polyolefin resin and the second polyolefin resin is defined as $W_{A'}$, the total amount of the polyamide resin and the modified elastomer is defined as $W_B$, and the total of $W_{A'}$ and $W_B$ is 100% by mass, the ratio of $W_B$ is usually 80% by mass or less (usually 0.5% by mass or more). When the ratio of $W_B$ is within the above range, excellent impact resistance and an excellent balance between rigidity and moldability can be achieved. The ratio of $W_B$ is preferably 5% by mass or more but 78% by mass or less, more preferably 10% by mass or more but 77% by mass or less, even more preferably 23% by mass or more but 76% by mass or less, even still more preferably 30% by mass or more but 75% by mass or less, particularly preferably 33% by mass or more but 72% by mass or less, more particularly preferably 35% by mass or more but 67% by mass or less, even more particularly preferably 37% by mass or more but 63% by mass or less.

Further, the content of each of the first polyolefin resin and the second polyolefin resin is not particularly limited. However, when the total of the first polyolefin resin and the second polyolefin resin is 100% by mass, the content of the second polyolefin resin is preferably 40% by mass or less. The content of the second polyolefin resin is more preferably 1% by mass or more but 30% by mass or less, particularly preferably 3% by mass or more but 25% by mass or less.

The specific gravity of the thermoplastic resin composition obtained using the modifier and the molded body is not particularly limited, but may usually be 1.05 or less. When the thermoplastic resin composition and the molded body have a polyamide resin content of 1% by mass or more but 40% by mass or less, a polypropylene resin content of 50% by mass or more but 75% by mass or less, and a maleic anhydride-modified olefin-based thermoplastic elastomer content of 5% by mass or more but 30% by mass or less, the specific gravity of the thermoplastic resin composition and the molded body may particularly be 0.89 or more but 1.05 or less, and may more particularly be 0.92 or more but 0.98 or less. That is, even when having the specific gravity equivalent to those of a polyethylene resin and a polypropylene resin, the thermoplastic resin composition and the molded body can offer much more excellent impact resistance and rigidity than these resins.

(5) Types of Molded Bodies

The shape, size, thickness, etc. of the molded body are not particularly limited, and its application is not particularly limited, either.

The molded body is used as various articles for use in vehicles such as automobiles, railway vehicles (general railway vehicles), aircraft fuselages (general fuselages), and boats and ships/hulls (general hulls), and bicycles (general bicycles).

Among them, articles for use in automobiles include exterior parts, interior parts, engine parts, and electrical parts. Specific examples of the exterior parts for automobiles include roof rails, fenders, fender liners, garnishes, bumpers, door panels, roof panels, hood panels, trunk lids, fuel lids, door mirror stays, spoilers, hood louvers, wheel covers, wheel caps, grill apron cover frames, lamp bezels, door handles (pull handles), door moldings, rear finishers, wipers, engine under covers, floor under covers, rocker moldings, cowl louvers, cowls (motorcycles) and film seat for motor parts.

Specific examples of the interior parts for automobiles include: trim parts such as door trim base materials (FR, RR, BACK), pockets, arm rests, switch bases, decorative panels, ornament panels, EA materials, speaker grills, and quarter trim base materials; pillar garnishes; cowl side garnishes (cowl side trims); seat parts such as shields, back boards, dynamic dampers, and side air bag peripheral parts; ceiling; carpet; instrument panel parts such as center clusters, registers, center boxes (doors), glove doors, cup holders, and air bag peripheral parts; center consoles; overhead consoles; sun visors, sun visors system parts such as sun visor brackets; deck boards (luggage boards); under trays; package trays; high mount stop lamp covers; CRS covers; seat side garnishes; scuff plates; room lamps; assist grips; safety belt parts; register blades; washer levers; window regulator handles; knobs of window regulator handles; and passing light levers.

Specific examples of the engine parts for automobiles include alternator terminals, alternator connectors, IC regulators, potentiometer bases for light dimmers, exhaust gas valves, fuel pipes, cooling pipes, brake pipes, wiper pipes, exhaust pipes, intake pipes, hoses, tubes, air intake nozzle snorkels, intake manifolds, fuel pumps, engine cooling water joints, carburetor main bodies, carburetor spacers, exhaust gas sensors, cooling water sensors, oil temperature sensors, brake pad wear sensors, throttle position sensors, crankshaft position sensors, air flow meters, brake pad wear sensors, brake pistons, solenoid bobbins, engine oil filters, and ignitor cases, and torque control levers.

Specific examples of the electrical parts for automobiles include battery peripheral parts, air conditioner thermostats, hot air flow control valves, brush holders for radiator motors, water pump impellers, turbine vanes, wiper motor-related parts, distributors, starter switches, starter relays, transmission wire harnesses, window washer nozzles, air conditioner panel switch boards, fuel-related electromagnetic valve coils, various connectors such as wire harness connectors, SMJ connectors, PCB connectors, door grommet connectors, and fuse connectors, horn terminals, electrical component insulating plates, step motor rotors, lamp sockets, lamp reflectors, lamp housings, cleaner cases, filter cases, and power trains.

Further, the molded body is used also as various articles for use in applications other than the above vehicles. Specific examples thereof include: industrial materials such as ropes, spun-bonded fabrics, polishing brushes, industrial brushes, filters, transport containers, trays, transport trolleys, and other general material;

electronic parts such as connectors, coils, sensors, LED lamps, sockets, resistors, relay cases, small switches, coil bobbins, condensers, variable capacitor cases, optical pick-ups, resonators, various terminal boards, transformers, plugs, printed circuit boards, tuners, speakers, microphones, headphones, compact motors, compact transmission gears, magnetic head bases, power modules, semiconductors, liquid crystals, FDD carriages, FDD chassis, motor brush holders, parabolic antennas, and computer-related parts;

electrical devices such as power generators, electric motors, electric transformers, current transformers, voltage regulators, rectifiers, inverters, relays, power contacts, switches, breakers, knife switches, multipole rods, electrical part cabinets and electric apparatus film;

industrial robot bodies, nursing-care robot bodies, drone (flying objects operated by remote control, flying objects capable of autonomously flying) bodies, home appliances and office equipment such as VTR parts, television parts, irons, hair dryers, rice cooker parts, microwave oven parts, acoustic parts, audio/LD parts, CD/DVD parts, lighting parts, refrigerator parts, washing machine parts, air conditioner parts, typewriter/word processor parts, office computer parts, PCs, game machines, tablet terminals, mobile phones, smart phones, telephones and related parts, facsimile parts, copier parts, cleaning/washing devices, motor parts and film seat for the household appliance;

optical and precision instruments such as cameras, clocks, microscopes, binoculars, telescopes, and eyeglasses;

everyday items and housewares such as storage cases (e.g., food trays, storage boxes, storage trays, attache cases, suitcases, helmets, water bottles, and bottles), toiletries, writing tools, stationery, book-slides, skin-care tools, utensils, tableware, laundry tools, cleaning tools, coat hangers, film for life miscellaneous goods, food containers, and lids (e.g., lids for glass bottles);

entertainment items such as toys;

machine tools/general machinery/machine parts such as mowing machine bodies, covers, power tool bodies, covers, and various clips;

sporting goods such as tennis racket strings, ski plates/boards, protectors (baseball, soccer, motor sports), shoes, shoe soles (shoe soles, soles for sports shoes), outdoor/climbing tools;

furniture-related items such as costume cases, tables, chairs, shoe boxes, kitchen utensils, toilet room goods, bathroom goods, curtain, bedding cover and blanket;

housing and civil engineering-related articles such as interior and exterior walls/roofs, heat insulating materials, door/door-related parts, window material-related parts, floor material-related parts, seismic isolating/damping parts, shutters, gutters, water supply and sewage-related parts (lifeline-related parts), parking garages, gas and power supply-related parts (lifeline-related parts), civil engineering parts, film and seat for engineering works and house use, traffic signals, road signs, pylons, center poles, guardrails (guard wires), and equipment for construction works;

medical supplies such as mouthpieces, medical equipment, drug containers and medical film;

clothing items such as uniform, working wear, sportswear, shirt, underwear (including socks), pants, shoes and heavy winter clothing-proof;

agriculture-, forestry-, and fishery-related items such as agricultural machinery, farming tools, flower pots (planters), fishing gear, marine culture-related tools, and tools for forestry industry.

Other examples of the molded body include pellets formed into various shapes.

[3] Method for Producing Modifier

A method for producing the modifier according to the present invention includes a melt-kneading step in which the second polyolefin resin and a melt-kneaded product of the polyamide resin and the modified elastomer are melt-kneaded.

The above "melt-kneaded product" is a thermoplastic resin composition obtained by melt-kneading the polyamide resin and the modified elastomer. Examples of each of the polyamide resin and the modified elastomer that can be used at this time are the same as those mentioned above.

The melt-kneaded product can be obtained by melt-kneading both the resins so that when the total of the polyamide resin and the modified elastomer is 100% by mass, the blending ratio of the polyamide resin is 10% by mass or more but 80% by mass or less. This makes it possible, when the melt-kneaded product and the second polyolefin resin are mixed, to obtain a modifier in which the polyamide resin is dispersed in the second polyolefin resin. More specifically, the modifier can have a phase structure in which a continuous phase (A) containing the second polyolefin resin is formed, and a dispersed phase (B) containing the polyamide resin and the modified elastomer is dispersed in the continuous phase (A). Further, a multiple phase structure can be obtained in which the dispersed phase (B) has a continuous phase ($B_1$) containing the polyamide resin and a fine dispersed phase ($B_2$) dispersed in the continuous phase ($B_1$) and containing the modified elastomer.

The blending ratio of the polyamide resin is preferably 12% by mass or more but 78% by mass or less, more preferably 14% by mass or more but 75% by mass or less, even more preferably 25% by mass or more but 73% by mass or less, even more preferably 30% by mass or more but 71% by mass or less, particularly preferably 34% by mass or more but 68% by mass or less, more particularly preferably 40% by mass or more but 64% by mass or less. When the blending ratio of the polyamide resin is within the above range, a modifier can be obtained in which the polyamide resin is dispersed as smaller particles in the second polyolefin resin.

It is to be noted that from the viewpoint of obtaining a polyamide resin rich-type modifier whose polyamide resin content is 50% by mass or more, the blending ratio of the polyamide resin may be 50% by mass or more but 80% by mass or less when the total of the polyamide resin and the modified elastomer is 100% by mass.

A kneading method used to obtain the meld-kneaded product is not particularly limited. The kneaded product can be obtained by, for example, using a kneading device such as an extruder (e.g. a single-screw extruder or a twin-screw extruder), a kneader, or a mixer (e.g., a high-speed flow mixer, a paddle mixer, or a ribbon mixer). These devices may be used singly or in combination of two or more of them. When two or more devices are used, they may be operated either continuously or batch-wise. Further, all the components of the kneaded product may be mixed at a time or may be mixed by adding them in several batches (multistage addition).

Further, the kneading temperature at which the melt-kneaded product is obtained is not particularly limited as long as melt-kneading can be performed, and the kneading temperature can be appropriately adjusted according to the type of each of the components. In particular, it is preferred that all the resins be kneaded in a molten state. More specifically, the kneading temperature may be 190° C. to 350° C., and is preferably 200° C. to 330° C., more preferably 205° C. to 310° C.

The "melt-kneading step" is a step in which the second polyolefin resin and the melt-kneaded product are melt-kneaded. Examples of the second polyolefin resin that can be used at this time are the same as those mentioned above, and the second polyolefin resin can be blended in such a manner as described above.

A kneading method used to obtain the modifier is not particularly limited, and the same device, operation mode, and kneading temperature as described above with reference to a case where the melt-kneaded product is obtained may be used.

[4] Method for Using Modifier

A method for using the modifier according to the present invention includes mixing 0.5 parts by mass or more but 70 parts by mass or less of the modifier per 100 parts by mass of the first polyolefin resin.

A molded body raw material obtained by mixing the first polyolefin resin and the modifier in such a manner as described above is usually molded to obtain a molded body. This makes it possible to obtain a molded body excellent in impact resistance while reducing the heat history load of the first polyolefin resin. The blending ratio of the modifier with the first polyolefin is preferably 1 part by mass or more but 50 parts by mass or less, more preferably 2 parts by mass or more but 48 parts by mass or less, even more preferably 3 parts by mass or more but 43 parts by mass or less, even still more preferably 4 parts by mass or more but 40 parts by mass or less, particularly preferably 5 parts by mass or more but 35 parts by mass or less.

A method for mixing the modifier and the first polyolefin resin and a means for performing the method are not particularly limited, but the molded body raw material can be obtained by dry blending using a blender.

Further, as described above, the molded body obtained using the modifier may contain, in addition to the first polyolefin resin, the second polyolefin resin, the polyamide resin, and the modified elastomer, various additives such as a flame retardant, a flame retardant aid, a filler, a colorant, an antimicrobial agent, and an antistatic agent. When these additives are added to the molded body, the modifier can be used as a carrier that carries these additives. Further, the modifier can be used also as a carrier for blending a foaming agent.

It is to be noted that a method for molding the molded body raw material is not particularly limited. Examples of the molding method include injection molding, extrusion molding (sheet extrusion, profile extrusion), T-die molding, blow molding, injection blow molding, inflation molding, blow molding, vacuum molding, compression molding, press molding, stamping molding, and transfer molding. These molding methods may be used singly or in combination of two or more of them.

It is to be noted that a molded body can be obtained by molding the molded body raw material, which has a continuous phase (A') containing a first polyolefin resin and a second polyolefin resin and a dispersed phase (B) dispersed in the continuous phase (A) and containing a polyamide resin and a modified elastomer, wherein the dispersed phase (B) is composed of a melt-kneaded product of the polyamide resin and the modified elastomer having a reactive group that reacts with the polyamide resin, and wherein when a total of the continuous phase (A') and the dispersed phase (B) is 100% by mass, a content of the dispersed phase (B) is 70% by mass or less, when a total of the first polyolefin resin and the second polyolefin resin is 100% by mass, a content of the second polyolefin resin is 70% by mass or less, and a heat history of the first polyolefin resin is lower than that of the second polyolefin resin. That is, a molded body can be obtained by molding, as the above-described thermoplastic resin, a mixture of the first polyolefin resin and the modifier containing the second polyolefin resin, the polyamide resin, and the modified elastomer.

This molded body obtained using the method described above can offer significantly excellent impact resistance while well maintaining rigidity that the first polyolefin originally has. Further, a molded body in which the heat history of the first polyolefin resin has been suppressed can be obtained by using, as the first polyolefin resin, part of a polyolefin to be used. That is, a molded body can be obtained by molding, as the above-described thermoplastic resin, a mixture of the first polyolefin resin and the modifier containing the second polyolefin resin, the polyamide resin, and the modified elastomer.

However, at the time of filing the present application, it is impossible to directly specify the property that the heat history of the first polyolefin resin is lower than that of the second polyolefin resin. Even if possible, it takes too much cost and time to specify such a property even with current analytical techniques, and therefore there are unpractical circumstances in light of the necessity of promptness etc., due to the nature of patent application.

[5] Carrier for Additives

A carrier for additives according to the present invention is a carrier for additives for use in adding an additive to a first polyolefin resin, the carrier including:

a continuous phase (A) containing a second polyolefin resin; and a dispersed phase (B) dispersed in the continuous phase (A) and containing a polyamide resin and a modified elastomer, wherein the dispersed phase (B) is composed of a melt-kneaded product of the polyamide resin and the modified elastomer having a reactive group that reacts with the polyamide resin, and wherein when a total of the continuous phase (A) and the dispersed phase (B) is 100% by mass, a content of the dispersed phase (B) is 80% by mass or less.

The components of the above-described modifier can directly be used as components of the carrier for additives, and the carrier for additives can be obtained by blending these components in the same manner as described above with reference to the modifier.

When a molded body is obtained, various additives may be blended with a base resin (in the present invention, the first polyolefin resin). Examples of the additives include a flame retardant, a flame retardant aid, a filler, a colorant, an antimicrobial agent, an antistatic agent, and a foaming agent. The details of the additives described above with reference to the modifier can directly be applied to these additives.

The amount of an additive to be blended is usually smaller than that of a base resin. Therefore, for the purpose of improving handleability and more accurately weighing the amount of an additive to be blended, an additive may be carried by a carrier (carrier for additive) so as to be blended with a base resin together with the carrier. When the base resin is, for example, a polyolefin resin, the carrier for additives to be used is preferably a resin compatible with the polyolefin resin. When the base resin is a polyolefin resin, addition of the carrier for additives according to the present invention is highly effective at imparting impact resistance even when the amount of the carrier for additives added is small.

It is to be noted that an additive to be used can be carried by the carrier for additives by appropriately blending them depending on the type or shape of the additive.

EXAMPLES

Hereinafter, the present invention will be specifically described with reference to examples.

[1] Production of Molded Bodies for Evaluation

<1> Modifier

A modifier was prepared by the following procedure. The modifier contained 55% by mass of a second polyolefin, 25% by mass of a polyamide resin, and 20% by mass of a modified elastomer per 100% of its total mass.

(1) Preparation of Molten Mixture

Pellets of the following polyamide resin and pellets of the following modified elastomer were dry-blended, then fed into a twin-screw melt-kneading extruder (manufactured by TECHNOVEL CORPORATION, screw diameter: 15 mm, L/D=59), and melt-kneaded under conditions of a kneading temperature of 210° C., an extrusion speed of 2.0 kg/hr, and a screw rotation speed of 200 rpm. The thus obtained melt-kneaded product was pelletized by a pelletizer to obtain pellets of the melt-kneaded product.

Polyamide resin: nylon 11 resin, manufactured by ARKEMA K.K., product name "Rilsan BMN 0", weight-average molecular weight 18,000, melting point 190° C.

Modified elastomer: maleic anhydride-modified ethylene-butene copolymer (modified EBR), manufactured by Mitsui Chemicals, Inc., product name "TAFMER MH7020", MFR (230° C.)=1.5 g/10 min (2) Preparation of Modifier The pellets of the molten mixture obtained in the above (1) and pellets of the following second polyolefin resin were dry-blended, then fed into a twin-screw melt-kneading extruder (manufactured by TECHNOVEL CORPORATION, screw diameter: 15 mm, L/D=59), and mixed under conditions of a kneading temperature of 210° C., an extrusion speed of 2.0 kg/hr, and a screw rotation speed of 200 rpm. The thus obtained modifier was pelletized by a pelletizer to obtain pellet shape of the modifier.

Second polyolefin resin: polypropylene resin, homopolymer, manufactured by Japan Polypropylene Corporation, product name "NOVATEC MA1B", weight-average molecular weight 312,000, melting point 165° C.

<2> Production of Molded Bodies of Examples 1 to 3

A molded body containing 90% by mass of a first polyolefin and 10% by mass of a modifier per 100% of its total mass (Example 1), a molded body containing 80% by mass of a first polyolefin and 20% by mass of a modifier per 100% of its total mass (Example 2), and a molded body containing 60% by mass of a first polyolefin and 40% by mass of a modifier per 100% of its total mass (Example 3) were each produced by the following procedure.

The pellets of the modifier obtained in the above [1](2) and pellets of the following first polyolefin resin were dry-blended to obtain a molded body raw material. The obtained molded body raw material was fed into a hopper of an injection molding machine (manufactured by NISSEI PLASTIC INDUSTRIAL CO., LTD., 40-ton injection molding machine) and injection-molded under injection conditions of a set temperature of 210° C. and a mold temperature of 60° C. to obtain test specimens for measuring physical properties.

First polyolefin resin (1): block copolymerized polyolefin resin having an ethylene block as a dispersed phase, manufactured by SunAllomer Ltd., product name "YS559N", melting point 165° C.

<3> Production of Molded Bodies of Examples 4 to 6

A molded body containing 80% by mass of a first polyolefin and 20% by mass of a modifier per 100% of its total mass (Example 4), a molded body containing 60% by mass of a first polyolefin and 40% by mass of a modifier per 100% of its total mass (Example 5), and a molded body containing 40% by mass of a first polyolefin and 60% by mass of a modifier per 100% of its total mass (Example 6) were each produced by the following procedure.

The modifier obtained in the above [1](2) and pellets of the following first polyolefin resin were dry-blended to obtain a molded body raw material. The obtained molded body raw material was fed into a hopper of an injection molding machine (manufactured by NISSEI PLASTIC INDUSTRIAL CO., LTD., 40-ton injection molding machine) and injection-molded under injection conditions of a set temperature of 210° C. and a mold temperature of 60° C. to obtain test specimens for measuring physical properties.

First polyolefin resin (2): Block copolymerized polyolefin resin having an ethylene block as a dispersed phase, manufactured by SK Chemical Co., Ltd., product name "BH3820"

<4> Production of Molded Bodies of Comparative Examples (1) Production of Molded Body of Comparative Example 1

The following polyolefin resin (which was the same as the first polyolefin resin (1) used for the molded bodies of Examples 1 to 3) was fed into a hopper of an injection molding machine (manufactured by NISSEI PLASTIC INDUSTRIAL CO., LTD., 40-ton injection molding machine) and injection-molded under injection conditions of a set temperature of 210° C. and a mold temperature of 60° C. to obtain test specimens for measuring physical properties.

Polyolefin resin (1): Block copolymerized polyolefin resin having an ethylene block as a dispersed phase, manufactured by SunAllomer Ltd., product name "YS559N", melting point 165° C.

(2) Production of Molded Bodies of Comparative Examples 2 and 3

Pellets of the following impact resistance-imparting agent conventionally used to impart impact resistance and pellets of the following polyolefin resin were dry-blended to obtain a molded body raw material, and the molded body raw material was fed into a hopper of an injection molding machine (manufactured by NISSEI PLASTIC INDUSTRIAL CO., LTD., 40-ton injection molding machine) and injection-molded under injection conditions of a set temperature of 210° C. and a mold temperature of 60° C. to obtain test specimens for measuring physical properties.

Polyolefin resin (1): Block copolymerized polyolefin resin having an ethylene block as a dispersed phase, manufactured by SunAllomer Ltd., product name "YS559N", melting point 165° C.

Impact resistance-imparting agent: manufactured by Mitsui Chemicals, Inc., product name "TAFMER DF810"

[2] Evaluations of Molded Bodies for Evaluation (1) Measurement of Charpy Impact Strength Measurement of Charpy impact strength was performed in accordance with JIS K 7111-1 using each of the specimens for evaluation of Examples 1 to 6 and Comparative Examples 1 to 3 obtained in the above [1]. The results of the measurement are shown in Table 1 and Table 2. It is to be noted that in the measurement of Charpy impact strength, impact strength was measured at a temperature of 23° C. by an edgewise test method using a specimen having a notch (type A).

(2) Observation of Morphology

A sample cut out from each of the test specimens of Examples 1 to 6 and Comparative Examples 1 to 3 that had been subjected to the measurement of Charpy impact strength described above in (1) was embedded in a resin. Then, the sample was trimmed and cut in a cross section using an ultramicrotome with a diamond knife and subjected to steam dyeing with a metal oxide. An ultrathin section sample was taken from the obtained cross section after dyeing and observed with a transmission electron microscope (TEM, manufactured by Hitachi High-Technologies Corporation, Model "HT7700") to observe a phase structure. The results of the observation are shown in Table 1 and Table 2.

Figure 2:
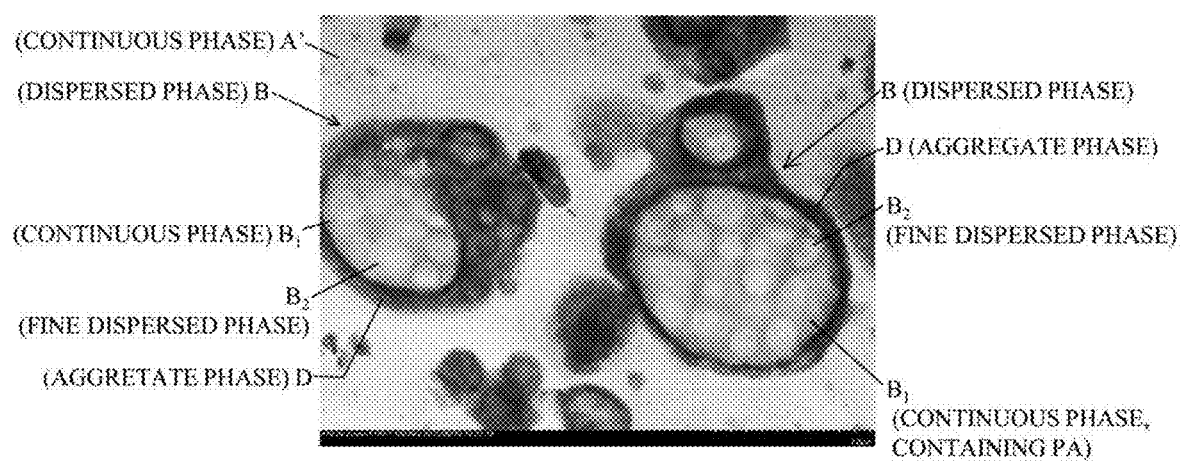
FIG. 2 is an image obtained by observing a thin sample cut out from the test specimen for evaluation of Example 3 with a transmission electron microscope.

It is to be noted that an image obtained from the sample of Example 3 is shown in FIG. 2. As shown in FIG. 2, a continuous phase (A) containing the first polyolefin resin and the second polyolefin resin, a dispersed phase (B) dispersed in the continuous phase (A) and containing the polyamide resin and the modified elastomer, a continuous phase ($B_1$) containing the polyamide resin, a fine dispersed phase ($B_2$) dispersed in the continuous phase ($B_1$) and containing the modified elastomer, and an aggregate phase (D) in which an ethylene block of the first polyolefin resin is aggregated at the interface between the continuous phase (A) and the dispersed phase (B) were observed.

It is to be noted that the aggregate phase (D) contains not only the ethylene block of the first polyolefin resin but also the modified elastomer.

(3) Measurement of Flexural Modulus

Measurement of flexural modulus was performed in accordance with JIS K 7171 using the test specimens for evaluation of Examples 1 to 6 and Comparative Examples 1 to 3 obtained in the above [1]. The results of the measurement are shown in Table 1 and Table 2. It is to be noted that the measurement of flexural modulus was performed by applying a load at a speed of 2 mm/min from an action point (curvature radius: 5 mm) located in the middle of the two points while supporting each of the test specimens at two points (curvature radius: 5 mm) whose distance (L) is 64 mm.

A graph of the correlation between the Charpy impact strength and the flexural modulus is shown in FIG. 1.

Examples 1 to 3. Further, the tendency was consistently observed also in all the Examples 4 to 6. This reveals that the effect can be exhibited irrespective of the type of the first polyolefin.

Further, as can be seen from the result shown in FIG. 2, a continuous phase (A') and a dispersed phase (B) are formed in the molded body obtained using the modifier. Further, it can be seen that a fine dispersed phase ($B_2$) is formed in the dispersed phase (B). In addition, it can be seen

TABLE 1

|  |  | Examples | | | Comparative Examples | | |
|---|---|---|---|---|---|---|---|
|  |  | 1 | 2 | 3 | 1 | 2 | 3 |
| First polyolefin (1) | PP (block) | 90 | 80 | 60 | 100 | 90 | 80 |
| modifier Polyamide | PA11 | 2.5 | 5 | 10 | | | |
| Modified elastomer | Maleic anhydride-modified EBR | 2 | 4 | 8 | | | |
| Second polyolefin | PP (homo) | 5.5 | 11 | 22 | | | |
| Total of polyolefins | | 95.5 | 91 | 82 | 100 | 90 | 80 |
| Conventional impact resistance-imparting agent | | — | — | — | — | 10 | 20 |
| Phase structure | Continuous phase (A) • Dispersed phase (B) | Present | | | Absent | | |
|  | Continuous phase ($B_1$) • Fine dispersed phase ($B_2$) | Present | | | Absent | | |
|  | Interfacial aggregation of EPR | Present | | | Absent | | |
| Charpy impact strength (kJ/m$^2$) | | 23 | 39 | 53 | 12 | 13 | 21 |
| Flexural modulus (MPa) | | 1006 | 929 | 864 | 1100 | 938 | 809 |

TABLE 2

|  |  | Examples | | |
|---|---|---|---|---|
|  |  | 4 | 5 | 6 |
| First polyolefin (2) | PP (block) | 80 | 60 | 40 |
| modifier Polyamide | PA11 | 5 | 10 | 15 |
| Modified elastomer | Maleic anhydride-modified EBR | 4 | 8 | 12 |
| Second polyolefin | PP (homo) | 11 | 22 | 33 |
| Total of polyolefins | | 91 | 82 | 73 |
| Phase structure | Continuous phase (A) • Dispersed phase (B) | Present | | |
|  | Continuous phase ($B_1$) • Fine dispersed phase ($B_2$) | Present | | |
|  | Interfacial aggregation of EPR | Present | | |
| Charpy impact strength (kJ/m$^2$) | | 53 | 57 | 60 |
| Flexural modulus (MPa) | | 845 | 830 | 810 |

[3] Effect

As can be seen from the results shown in Tables 1 and 2 and FIG. 1, when 10% by mass of the conventionally-used impact resistance-imparting agent was added (Comparative Example 2) to improve the impact resistance of the first polyolefin (Comparative Example 1), the Charpy impact strength was improved by 8.3%, whereas the Charpy impact strength of the molded body obtained using the modifier containing 10% by mass of the modifier (Example 1) was improved by 91.6%. This reveals that even when the amount of the modifier added is small, addition of the modifier is significantly effective at imparting impact resistance. In addition, when 10% by mass of the conventionally-used impact resistance-imparting agent was added (Comparative Example 1), the flexural modulus was reduced by 15.6%, whereas a reduction in the flexural modulus of the molded body obtained using the modifier containing 10% by mass of the modifier (Example 1) was suppressed to 8.5%. This reveals that a reduction in rigidity can be extremely suppressed while significantly high impact resistance is achieved. This tendency was consistently observed in all the that when a block copolymerized polyolefin resin having an ethylene block as a dispersed phase is used as the first polyolefin resin, at least part of the ethylene block (EPR) is aggregated at the interface between the continuous phase (A) and the dispersed phase (B). It is considered that such aggregation results in more excellent impact resistance.

It is to be noted that the present invention is not limited to the specific examples described above, and various modifications may be made to the examples within the scope of the present invention depending on the purpose or intended use.

More specifically, for example, in the above examples, molded bodies were obtained by molding molded body raw materials obtained by dry-blending pellets of the modifier and pellets of the first polyolefin resin. However, pellets obtained by melt-kneading pellets of the modifier and pellets of the first polyolefin resin may, of course, be used as a molded body raw material.

The above-described examples are for illustrative purposes only, and shall not be construed as limiting the present invention. Although the present invention has been described with reference to exemplary embodiments, it is understood that the words used in the description and drawings of the present invention are explanatory and illustrative rather than restrictive. As described in detail herein, modifications may be made to the embodiments within the scope of the appended claims without departing from the scope and spirit of the present invention. Although the present invention has been described in detail with reference to particular structures, materials, and examples, the present invention is not intended to be limited to the particulars disclosed herein, rather the present invention extends to all the functionally-equivalent structures, methods, and uses within the scope of the appended claims.

The invention claimed is:

1. A method for using a modifier, comprising:
    dry blending 0.5 parts by mass or more but 70 parts by mass or less of the modifier per 100 parts by mass of a first polyolefin resin;
    wherein:
    the modifier comprises:
        a continuous phase (A) containing a second polyolefin resin, and
        a dispersed phase (B) dispersed in the continuous phase (A) and containing a polyamide resin and a modified elastomer;
    the dispersed phase (B) is composed of a melt-kneaded product of the polyamide resin and the modified elastomer having a reactive group that reacts with the polyamide resin;
    when a total of the continuous phase (A) and the dispersed phase (B) is 100% by mass, a content of the dispersed phase (B) is 80% by mass or less; and
    the first polvolefin resin is a propylene-ethylene block copolymer.

2. The method of claim 1, wherein the modified elastomer is an olefin-based thermoplastic elastomer having, as its skeleton, a copolymer of ethylene and α-olefin having 3 to 8 carbon atoms, or a copolymer of propylene and an α-olefin having 4 to 8 carbon atoms, or a styrene-based thermoplastic elastomer having a styrene skeleton.

3. The method of claim 1, wherein when a total of the polyamide resin and the modified elastomer is 100% by mass, a content of the polyamide resin is 10% by mass or more but 80% by mass or less.

4. The method of claim 1, wherein the dispersed phase (B) has a continuous phase ($B_1$) containing the polyamide resin and a fine dispersed phase ($B_2$) dispersed in the continuous phase ($B_1$) and containing the modified elastomer.

5. The method of claim 1, further comprising producing; the modifier by a method that comprises:
    melt-kneading together the polyamide resin and the modified elastomer to obtain the melt-kneaded product of the polyamide resin and the modified elastomer; and
    melt-kneading together the second polyolefin resin and the melt-kneaded product of the polyamide resin and the modified elastomer.

6. The method of claim 1, wherein the first polyolefin resin and the second polyolefin resin are the same.

7. The method of claim 1, wherein the first polyolefin resin and the second polyolefin resin are different.

* * * * *